United States Patent [19]

Thies

[11] Patent Number: 4,565,841

[45] Date of Patent: Jan. 21, 1986

[54] SPIRIT DUPLICATING WITH INDICIA FORMED BY INK COMPRISING DYE MEANS AND SMUDGE-RESISTANT BINDER MEANS SOLUBLE IN SPIRIT DUPLICATING FLUID

[75] Inventor: Curt Thies, Ballwin, Mo.

[73] Assignee: The Nimrod Press, Inc., Boston, Mass.

[21] Appl. No.: 74,060

[22] Filed: Sep. 10, 1979

[51] Int. Cl.[4] .................. C08L 1/18; C08L 3/02; C09D 11/00

[52] U.S. Cl. ................................. 524/31; 524/47; 524/376; 282/27 R; 260/DIG. 38

[58] Field of Search .................. 106/22, 23, 25, 213, 106/214, 14.5; 260/17.4 ST, 42.21, DIG. 38; 282/27.5; 524/47, 376, 31

[56] References Cited

U.S. PATENT DOCUMENTS

| | | | |
|---|---|---|---|
| 1,930,178 | 10/1933 | Mizener | 106/25 |
| 1,932,248 | 10/1933 | Miner et al. | 106/25 |
| 2,163,934 | 6/1939 | Collins | 101/472 |
| 2,647,060 | 7/1953 | Armstrong et al. | 106/26 |
| 2,868,741 | 1/1959 | Chambers et al. | 106/25 |
| 2,898,852 | 8/1959 | Staehle | 101/472 |
| 3,931,443 | 1/1976 | Neale et al. | 101/472 |
| 4,108,671 | 8/1978 | Richlin | 106/22 |
| 4,195,104 | 3/1980 | Fell | 260/DIG. 38 |
| 4,206,937 | 6/1980 | Huston | 106/22 |
| 4,272,292 | 6/1981 | Mizuno et al. | 106/22 |

FOREIGN PATENT DOCUMENTS

| | | | |
|---|---|---|---|
| 1907582 | 12/1970 | Fed. Rep. of Germany | 106/25 |
| 0121808 | 9/1979 | Japan | 260/DIG. 38 |
| 292655 | 6/1928 | United Kingdom | 106/25 |
| 712296 | 7/1954 | United Kingdom | 260/DIG. 38 |

*Primary Examiner*—John Kight
*Assistant Examiner*—Nathan M. Nutter
*Attorney, Agent, or Firm*—Charles Hieken

[57] ABSTRACT

A spirit duplicating master ink contains more than 50 weight % of methyl violet, a binder of poly(vinyl methyl ether) that is of the order of 5 weight % and a 2-ethoxy-ethanol carrier solution of the order of 30 weight % with corn starch filler of the order of 10 weight %. This ink is printed upon a spirit duplicating master to leave a residue with the methyl violet weight % of the order of 73%, that of the 2-ethoxy-ethanol of the order of 7% and that of the corn starch of the order of 20%.

30 Claims, No Drawings

SPIRIT DUPLICATING WITH INDICIA FORMED BY INK COMPRISING DYE MEANS AND SMUDGE-RESISTANT BINDER MEANS SOLUBLE IN SPIRIT DUPLICATING FLUID

BACKGROUND OF THE INVENTION

The present invention relates in general to spirit duplicating and more particularly concerns a novel spirit duplicating ink that may be used in making duplicating masters for use with conventional spirit duplicating machines to legibly reproduce many copies of the master while the master is essentially free from smudge.

A conventional spirit duplicating machine carries a master that has been impressed with methyl violet through typing or printing that is released upon copy paper moistened with a volatile spirit fluid to reproduce the master image on the copy paper. A master is typically capable of producing at least about 200 copies.

A serious problem with conventional duplicating masters is their tendency to smudge. The problem is especially serious in connection with providing duplicating masters in book form for use by schools to reproduce student learning material from the masters upon a conventional duplicating machine. The present approach for dealing with this problem involves interleaving duplicating masters with protective sheets to prevent smudging while the book is being handled. Furthermore, care must be taken during assembly of books of duplicating masters to avoid smudging the masters. Both the protective interleaved sheets and the special handling required during binding increase the cost of spirit duplicator master books.

Not only is the smudge problem disadvantageous from the standpoint of interfering with the clarity of reproduction from masters, but the smudge problem also results in secretarial or other personnel handling masters subject to hands and/or wearing apparel dirtied by the easily transferable ink on the master.

Accordingly, it is an important object of the invention to provide improved materials and techniques for significantly reducing the smudge problem noted above.

It is another object of the invention to achieve the preceding object while still providing many legible copies from the master.

It is another object of the invention to achieve one or more of the preceding objects with an improved ink for spirit duplicator masters that is so free from smudging that it does not dirty the hands of secretarial or other personnel during normal handling and may be applied to masters bound in books without protective sheets interleaved between adjacent masters. It is another object of the invention to achieve one or more of the preceding objects with an improved spirit duplicating ink that may be used with conventional printing presses to reproduce spirit duplicating masters essentially free of the smudge problem noted above.

SUMMARY OF THE INVENTION

According to the invention, the improved spirit duplicator master comprises methyl violet bound to a paper or other substrate by binder means, such as poly(vinyl methyl ether), a polymer sold by GAF Corporation. The methyl violet and binder means are in carrier or solvent means for dissolving the methyl violet and binder means, this carrier means typically being Ethyl Cellosolve, a product available from the Union Carbide Corporation. According to another feature of the invention, small amounts of a less volatile solvent, such as triethyleneglycol, may be added to the Ethyl Cellosolve to reduce solvent loss when the mixture of methyl violet, binder means and carrier means is impressed upon sheets to form spirit duplicator masters, such as by silk-screening. To help prevent smudge problems, absorbent granules, such as starch granules, are added to the mixture before printing to form a spirit duplicator master.

The combination of binder means and solvent means has a number of advantageous properties. The specific poly(vinyl methyl ether) polymer preferably used as the primary means is soluble in both water and a wide range of organic solvents and thus functions as a vehicle for both binding the dye to the paper and allowing transfer of the bound dye to the copy sheet moistened with a mixture of water and methanol.

Another important aspect of the invention is the high solubility of the dye such as methyl violet in the carrier means, such as Ethyl Cellosolve, facilitating the preparation of very concentrated dye solutions. When these concentrated solutions dry after impression upon the master sheet, the residue is rich in dye and poor in binder to facilitate ready transfer of the dye to a copy sheet.

Still another important aspect of the invention is the use of the filler granules, such as starch granules, as filler means for providing enhanced resistance to smudging. These granules do not handicap ink transfer but allow the duplicating master to be more easily handled without smudging and assembled in books without interleaved protective sheets.

Numerous other features, objects and advantages of the invention will become apparent from the following detailed description of preferred embodiments.

DETAILED DESCRIPTION OF PREFERRED EMBODIMENTS

Before setting forth specific examples, it is helpful to consider how spirit duplicating masters function. A typical spirit duplicating machine includes a rotating drum for receiving the master. There is means for sequentially feeding each sheet in a stack after moistening with spirit duplicating fluid, typically a mixture of water and methanol, in contact with the rotating drum containing the spirit duplicating master. The duration of contact between each copy sheet and the master on the rotating drum is short, much less than a second. Accordingly, the dye on the spirit duplicating master must transfer to the moistened sheet very quickly. Conventional prior art duplicating masters allow for this rapid transfer by having the dye essentially unprotected on the surface of the master sheet readily available for transfer to form an impression. This ready availability also results in prior art duplicating masters having serious smudge problems.

The present invention overcomes the smudge problem while still allowing easy transferability of the dye to the moistened copy paper during the short contact interval. The poly(vinyl methyl ether) binder means is soluble in both the water/methanol mixture typically used as spirit duplicating fluids and in the carrier means, such as Ethyl Cellosolve, used as a carrier or solvent for the dye, such as methyl violet. Thus the invention allows rapid transfer of the methyl violet from the duplicating master to a copy sheet in the brief moment that the duplicating master is in contact with the copy sheet moistened with the spirit duplicating fluid.

Another important aspect of the invention is the discovery that methyl violet is very soluble in Ethyl Cellosolve. It is possible to form over 50 weight % methyl violet solutions with ethyl cellosolve as the solvent. Accordingly, very concentrated dye solutions may be prepared with the invention. When these solutions dry after printing upon the surface of the master sheet, the residue is rich in dye and poor in binder to facilitate ready transfer of the dye to a copy sheet. The high concentration facilitates transfer to reproduce the master on many copy sheets.

Furthermore, the use of filler means such as starch granules provides enhanced resistance to smudging. These granules do not interfere with ink transfer, but make the duplicating master more easily handled without smudging.

We turn now to specific examples:

EXAMPLE 1

(CT-6-21-79-1B)

56.2 grams of methyl violet were dissolved in 40 grams of an Ethyl Cellosolve solution containing 12.8 weight % of poly(vinyl methyl ether) (Gantrez M093, GAF Corporation). To this was added 14 grams corn starch (Sigma Chemicals). The resulting mixture was then silk-screened onto a paper substrate. This duplicating master gave over 200 legible impressions and showed significantly less smudge during handling than current duplicating masters.

EXAMPLE 2

(CT-6-21-79-1A)

An ink was formulated like that in Example 1 except that no corn starch was added. This ink also gave over 200 legible impressions and showed significantly less smudge during handling than current duplicating masters. However, its smudge resistance was not as good as that provided by the ink from Example 1.

The above two examples illustrate the value of the new ink formulation based on poly(vinyl methyl ether) as the ink binder. However, it should be recognized that blends of poly(vinyl methyl ether) with other polymers can serve as binders. The following examples illustrate this point.

EXAMPLE 3

(CT-6-21-79-2A)

56.2 grams of methyl violet were dissolved in 40.8 grams of an Ethyl Cellosolve solution containing 6.0 weight % poly(vinyl methyl ether) (Gantrez M093) and 2.8 weight % (wet) Hercules SS nitrocellulose (5-6 sec) (the solvent in this nitrocellulose is isopropanol). The resulting mixture was silk-screened onto a paper substrate. This duplicating master gave over 200 legible impressions and showed good smudge resistance, although not as good as that in Example 1.

EXAMPLE 4

(CT-5-25-79-1A)

65 grams of methyl violet were dissolved in 50 grams of an Ethyl Cellosolve solution 9.8 weight % poly(vinyl methyl ether) (Gantrez M093, GAF) and 3.2 weight % Hercules SS nitrocellulose (5-6 sec) (Hercules Chemical Co.). The resulting mixture was silk-screened onto a paper substrate. This duplicating master gave over 200 copies and showed good smudge resistance, although not as good as Example 1.

One may use nitrocellulose/poly(vinyl methyl ether) blends other than that mentioned in Examples 3 and 4. For example, more nitrocellulose and less poly(vinyl methyl ether) could be used. However, as one uses more nitrocellulose, the copies obtained from the duplicating master may become less intense in color, and an intense coloration is desirable. There may also be some reduction in abrasion resistance. A specific example of an ink with more nitrocellulose in it is as follows:

EXAMPLE 5

(CT-5-25-79-1A)

65 grams of methyl violet were dissolved in 50 grams of an Ethyl Cellosolve solution containing 9.4 weight % nitrocellulose (Hercules grade SS, 5-6 sec, shipped with isopropanol as the solvent) and 6.0 weight % poly(vinyl methyl ether) (Gantrez M093). The resulting mixture was silk-screened onto a paper substrate. The duplicating master gave over 200 legible copies, but was not as abrasion or smudge resistant as Example 4.

The above examples illustrate the type of inks being formulated to give smudge-resistant duplicating masters that will give at least 200 impressions of sufficient legibility. Although poly(vinyl methyl ether) and blends of this polymer with other polymers is a preferred binder, it must be recognized that other vinyl ether polymers (e.g., poly(butyl vinyl ether) are also candidate binder polymers. The preferred solvent, Ethyl Cellosolve, could also be replaced in part by other, less volatile solvents in order to prolong the lifetime of the ink in the silk-screen frame. Triethyleneglycol is a specific example. Other candidate solvents are 2-ethoxyethyl acetate, 2-(2-ethoxyethoxy)ethanol, and 2-(2-ethoxyethoxy)ethyl acetate. Ethyl Cellosolve is the Union Carbide trademark for a chemical compound called 2-ethoxyethanol. All of the above chemical compounds are in some way structurally similar to Ethyl Cellosolve. Other polyether polymers may be binders according to the invention. Specifically, poly(propylene oxide) and copolymers of propylene oxide with ethylene oxide could be used.

Calculations of composition of the dry residues of the inks described in three of the above examples are set forth below. These calculations assume that all the solvent used to formulate the ink is removed on drying, leaving behind all the dye and binder (a most reasonable assumption).

| Example No. | Sample Code No. | Dry Ink Composition, Weight % | | |
| --- | --- | --- | --- | --- |
| | | Methyl Violet | Binder | Starch |
| 1 | CT-6-21-79-1B | 73.0 | 7.4 | 19.6 |
| 2 | CT-6-21-79-1A | 90.9 | 9.1 | 0.0 |
| 3 | CT-6-21-79-2A | 94.3 | 5.7 | 0.0 |

As can be seen from this tabulation, the residue of starch-free inks are richer in methyl violet when dried. Addition of starch to the (wet or dry) ink reduces the % methyl violet in the ink, but this does not greatly reduce the legibility of copies obtained from duplicating masters formed from said ink. The starch acts as a filler or spacer that reduces smudge or abrasion of the ink residue.

There has been described novel techniques and compositions for making spirit duplicating masters free from the smudge problem and yet capable of producing many legible copies using relatively inexpensive substances relatively easy and inexpensive to assemble and use in printing. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A spirit duplicating master comprising,
   a master sheet,
   indicia comprising a first significant weight % of dye means soluble in a spirit duplicating fluid comprising water and an organic solvent for producing a visible image on said master sheet and a second significant but lesser than said first significant weight % of binder means consisting essentially of nitrocelloulose and poly(vinyl methyl ether) and soluble in both the water and organic solvent comprising said spirit duplicating fluid for releasably binding said dye means to said master sheet essentially free from smudge while negligibly interfering with transfer of said dye means from said master sheet to a copy sheet moistened with said spirit duplicating fluid,
   said indicia being formed by a dry residue of ink comprising said dye means, said binder means and carrier means for carrying said dye means and said binder means in solution,
   said dry residue being rich in said dye means and poor in said binder means to facilitate ready transfer of said dye means to a copy sheet from said master sheet,
   said dye means and said binder means being soluble in said carrier means.

2. A spirit duplicating master in accordance with claim 1 wherein said dye means is at least substantially 50 weight % methyl violet.

3. A spirit duplicating master in accordance with claim 1 wherein said binder means is a solvent for said dye means.

4. A spirit duplicating master in accordance with claim 1 wherein said spirit duplicating fluid comprises a mixture of water and methanol.

5. A spirit duplicating master in accordance with claim 1 and further comprising filler means for enhancing smudge resistance.

6. A spirit duplicating master in accordance with claim 5 wherein said filler means comprises corn starch granules.

7. A spirit duplicating master in accordance with claim 5 wherein the weight % of said filler means is greater than that of said binder means and less than that of said dye means.

8. A spirit duplicating master in accordance with claim 7 wherein the weight % of said dye means is of the order of 73%, that of said binder means is of the order of 7% and that of said filler means is of the order of 20%.

9. A spirit duplicating master in accordance with claim 1 wherein the weight % of said dye means is of the order of 91% and that of said binder means is of the order of 9%.

10. A spirit duplicating master in accordance with claim 1 wherein the weight % of said dye means is of the order of 94% and that of said binder means is of the order of 6%.

11. A spirit duplicating master ink comprising,
    dye means,
    binder means consisting essentially of nitrocellulose and poly(vinyl methyl ether),
    and carrier means for carrying said dye means and said binder means in solution, p1 said dye means being soluble in spirit duplicating fluid comprising water and an organic solvent and said carrier means for providing a visible image on a spirit duplicating master,
    said binder means being soluble in said carrier means and both the water and organic solvent comprising said spirit duplicating fluid for releasably binding said dye means to said master essentially free from smudge while negligibly interfering with transfer of said dye means from said master to a copy sheet moistened with said spirit duplicating fluid.

12. A spirit duplicating master ink in accordance with claim 11 wherein said dye means is at least substantially 50 weight % methyl violet.

13. A spirit duplicating master ink in accordance with claim 11 wherein said binder means is a solvent for said dye means.

14. A spirit duplicating master ink in accordance with claim 11 wherein said spirit duplicating fluid comprises a mixture of water and methanol.

15. A spirit duplicating master ink in accordance with claim 11 wherein said carrier means is from the group consisting of 2-ethoxy-ethanol, 2-ethoxyethyl acetate, 2-(2-ethoxyethoxy)ethanol and 2-(2-ethoxyethoxy)ethyl acetate.

16. A spirit duplicating master ink in accordance with claim 15 wherein said carrier means comprises 2-ethoxy-ethanol.

17. A spirit duplicating master ink is accordance with claim 15 wherein said carrier means comprises 2-ethoxy-ethanol.

18. A spirit duplicating master ink in accordance with claim 17 wherein said carrier means further comprises a solvent means less volatile than said 2-ethoxy-ethanol for prolonging the lifetime of said ink when in a silk screen printing frame.

19. A spirit duplicating master ink in accordance with claim 18 wherein said less volatile solvent means is from the group consisting of triethyleneglycol, 2-ethoxyethyl acetate, 2-(2-ethoxyethoxy)ethanol and 2-(2-ethoxyethoxy)ethyl acetate.

20. A spirit duplicating master ink in accordance with claim 16 wherein said less volatile solvent means comprises triethyleneglycol.

21. A spirit duplicating master ink in accordance with claim 11 and further comprising filler means for enhancing smudge resistance.

22. A spirit duplicating master ink in accordance with claim 21 wherein said filler means comprises corn starch granules.

23. A spirit duplicating master ink in accordance with claim 21 wherein the weight % of said filler means is greater than that of said binder means and less than that of said dye means.

24. A spirit duplicating master ink in accordance with claim 23 wherein the weight % of said dye means is of the order of 50%, that of said binder means is of the order of 5%, that of said filler means is of the order of 13% and that of said carrier means is of the order of 32%.

25. A spirit duplicating master ink in accordance with claim 11 wherein the weight % of said dye means is of the order of 58%, that of said binder means is of the order of 5% and that of said carrier means is of the order of 37%.

26. A spirit duplicating master ink in accordance with claim 11 wherein the weight percent of said dye means is of the order of 58%, that of said binder means is of the order of 4% and that of said carrier means is of the order of 38%.

27. A spirit duplicating master ink in accordance with claim 11 wherein the weight % of said dye means is of the order of 57%, that of said binder means is of the order of 5% and that of said carrier means is of the order of 38%.

28. A spirit duplicating master ink in accordance with claim 11 wherein the weight % of said dye means is of the order of 57%, that of said binder means is of the order of 7% and that of said carrier means is of the order of 36%.

29. A spirit duplicating master in accordance with claim 1 wherein said indica comrise dye means within the range of 50 to 95 weight % and binder means within 0.5 to 10 weight %.

30. A spirit duplicating master in accordance with claim 29 wherein said indicia further comprise filler means within the range 10 to 30 weight %.

* * * * *